US010824976B2

(12) United States Patent
Andersson et al.

(10) Patent No.: US 10,824,976 B2
(45) Date of Patent: Nov. 3, 2020

(54) INFEASIBILITY MANAGEMENT IN E-SOURCING SYSTEMS

(71) Applicant: COUPA SOFTWARE INCORPORATED, San Mateo, CA (US)

(72) Inventors: Arne Andersson, Uppsala (SE); Fredrik Ygge, Västra Frölunda (SE); Mattias Willman, Uppsala (SE); Ulf Ekström, Knivsta (SE); Claes Ekström, Uppsala (SE); Roger Björnstedt, Helsingborg (SE)

(73) Assignee: Coupa Software Incorporated, San Mateo, CA (US)

( * ) Notice: Subject to any disclaimer, the term of this patent is extended or adjusted under 35 U.S.C. 154(b) by 640 days.

(21) Appl. No.: 14/947,016

(22) Filed: Nov. 20, 2015

(65) Prior Publication Data
US 2016/0148291 A1    May 26, 2016

Related U.S. Application Data

(60) Provisional application No. 62/083,793, filed on Nov. 24, 2014.

(51) Int. Cl.
*G06Q 10/06* (2012.01)
*G06Q 30/06* (2012.01)
(Continued)

(52) U.S. Cl.
CPC ..... *G06Q 10/06313* (2013.01); *G06Q 10/067* (2013.01); *G06Q 10/0631* (2013.01);
(Continued)

(58) Field of Classification Search
CPC ......... G06Q 30/06–0645; G06Q 30/08; G06Q 50/01; G06Q 10/04; G06Q 10/06313; G06Q 10/06315; G06Q 10/0631; G06Q 10/067
See application file for complete search history.

(56) References Cited

U.S. PATENT DOCUMENTS 7,809,581 B1    10/2010   Neal et al.
8,190,490 B2 *   5/2012   Sandholm .......... G06Q 30/0222
                                           705/26.3
(Continued)

OTHER PUBLICATIONS

Chinneck, John W., "Feasibility and Infeasibility in Optimization: A Tutorial", http://www.sce.jarleton.ca/faculty/chinneck/docs/CPAIOR07InfeasibilityTutorial.pdf, May 23-26, 2007. (Year: 2007).*
(Continued)

*Primary Examiner* — Adam L Levine
(74) *Attorney, Agent, or Firm* — Baker Botts L.L.P.

(57) ABSTRACT

Systems, apparatuses, and methods for providing feedback in an electronic sourcing system. A system is configured to receive a first optimization model whose solution represents an allocation or award of items being bid upon. The first optimization model comprises a plurality of bids and one or more allocation rules representing one or more constraints on the allocation. Subsequent to determining the optimization model is not feasible, the system is configured to compare the one or more allocation rules to a reference allocation. Subsequent to determining an allocation rule of the one or more allocation rules is in conflict with the reference allocation, system is configured to relax the allocation rule in the first optimization model to create a second optimization model, and solve the second optimization model to generate an allocation compatible with the second optimization model.

13 Claims, 11 Drawing Sheets

(51) Int. Cl.
  G06Q 30/08 (2012.01)
  G06Q 10/04 (2012.01)
(52) U.S. Cl.
  CPC ... *G06Q 10/06315* (2013.01); *G06Q 30/0609* (2013.01); *G06Q 30/0611* (2013.01); *G06Q 30/08* (2013.01); *G06Q 10/04* (2013.01)

(56) References Cited

U.S. PATENT DOCUMENTS

| | | | |
|---|---|---|---|
| 8,412,551 | B2 | 4/2013 | Feng et al. |
| 8,645,310 | B2 | 2/2014 | Jiang et al. |
| 2003/0033236 | A1* | 2/2003 | Davenport ........... G06Q 10/087 705/37 |
| 2005/0091122 | A1 | 4/2005 | Kiefer et al. |
| 2005/0091143 | A1 | 4/2005 | Schmidt et al. |
| 2007/0027739 | A1 | 2/2007 | Connors et al. |
| 2010/0042556 | A1 | 2/2010 | Erickson |
| 2013/0046647 | A1 | 2/2013 | Robertson et al. |
| 2013/0085660 | A1 | 4/2013 | Wang et al. |

OTHER PUBLICATIONS

Achterberg, Tobias, "SCIP—a framework to integrate Constraint and Mixed Integer Programming", Technical Report, Jun. 2004, 28 pages, http://citeseerx.ist.psu.edu/viewdoc/download?doi=10.1.1.455.8212&rep=rep1&type=pdf. [Retrieved Nov. 2, 2016].

Amaldi et al., "The Complexity and Approximability of Finding Maximum Feasible Subsystems of Linear Relations", Theoretical Computer Science, 1995, pp. 181-210, vol. 147, Issues 1-2, http://www.sciencedirect.com/science/article/pii/030439759400254G. [Retrieved Nov. 2, 2016].

Amaldi et al., "Some Structural and Algorithmic Properties of the Maximum Feasible Subsystem Problem", Proceedings of the 7th International IPCO Conference on Integer Programming and Combinatorial Optimization, Jun. 1999, pp. 45-59, http://ai2-s2-pdfs.s3.amazonaws.com/f967/307ccef1c56a5f94b70c842eaf14408cbe59.pdf. [Retrieved Nov. 2, 2016].

Amaldi et al., "On the Maximum Feasible Subsystem Problem, IISs, and IIS-hypergraphs", Mathematical Programming, Mar. 2003, vol. 95, Issue 3, 21 pages, http://www.mathematik.tu-darmstadt.de/~pfetsch/Publications/maxfs.pdf. [Retrieved Nov. 2, 2016].

Andersson et al., "Integer Programming for Combinatorial Auction Winner Determination", ICMAS '00 Proceedings of the Fourth International Conference on MultiAgent Systems (ICMAS-2000), Jul. 10, 2000, 8 pages, IEEE Computer Society, Washington, DC, USA.

Badros, et al., "The Cassowary Linear Arithmetic Constraint Solving Algorithm", ACM Transactions on Computer-Human Interaction, Dec. 2001, pp. 267-306, vol. 8, Issue 4, ACM, New York, NY, USA.

Bailey et al., "Discovery of Minimal Unsatisfiable Subsets of Constraints Using Hitting Set Dualization", Proceedings of the 7th International Conference on Practical Aspects of Declarative Languages, Jan. 10, 2005, pp. 174-186, https://pdfs.semanticscholar.org/4619/116d00e2b29acf97621438a5f2f639f0bae1.pdf. [Retrieved Nov. 2, 2016].

De La Banda et al., "Finding All Minimal Unsatisfiable Subsets", Proceedings of the 5th ACM SIGPLAN International Conference on Principles and Practice of Declarative Programming, Aug. 2003, pp. 32-43, https://www.researchgate.net/profile/Maria_Garcia_de_la_Banda/publication/221336523_Finding_All_Minimal_Unsatisfiable_Subsets/links/02e7e51a55deb00ee7000000.pdf?origin=publication_detail. [Retrieved Nov. 2, 2016].

Bockmayr et al., "Detecting Infeasibility and Generating Cuts for MIP using CP", Computers and Operations Research, Oct. 2006, pp. 2777-2786, vol. 33, Issue 10, http://page.mi.fu-berlin.de/bockmayr/cpaior.pdf. [Retrieved Nov. 2, 2016].

Boman, Erik G., "Infeasibility and Negative Curvature in Optimization", Feb. 1999, 134 pages, http://www.sandia.gov/~egboman/papers/Boman-thesis.pdf. [Retrieved Nov. 2, 2016].

Chen et al., "Hybrid Misclassification Minimization", Advances in Computational Mathematics, 1995, 9 pages.

Chinneck, John W., "Finding a Useful Sub-Set of Constraints for Analysis in an Infeasible Liner Program", Informs Journal of Computing, 1997, pp. 164-174, vol. 9, No. 2.

Chinneck, John W., "Feasibility and Infeasibility in Optimization: A Tutorial", May 23-26, 2007, http://www.sce.carleton.ca/faculty/chinneck/docs/CPAIOR07InfeasibilityTutorial.pdf. [Retrieved Nov. 2, 2016].

Debrosse et al., "A Feasible-Point Algorithm for Structured Design Systems in Chemical Engineering", AIChE Journal, 1973, pp. 251-258, vol. 19, No. 2.

Elbassioni et al., "On the approximability of the maximum feasible subsystem problem with 0/1-coefficients", SODA 09 Proceedings of the twentieth Annual ACM-SIAM Symposium on Discrete Algorithms, Jan. 2009, pp. 1210-1219.

Feng, Jinghua, "Redundancy in Nonlinear Systems: A Set Covering Approach", MSc. Thesis, University of Windsor, 1999, 76 pages.

Gleeson et al., "Identifying Minimally Infeasible Subsystems of Inequalities", ORSA Journal on Computing, 1990, 8 pages.

Greenberg, Harvey J., "Computer-Assisted Analysis for Diagnosing Infeasible or Unbounded Linear Programs", Mathematical Programming Study 31, 1987, pp. 79-97.

Greenberg, Harvey J., "Diagnosing Infeasibility for Min-Cost Network Flow Problems—Part I: Dual Infeasibility", IMA Journal of Mathematics in Management, 1987, pp. 99-109.

Greenberg, Harvey J., "An Empirical Analysis of Infeasibility Diagnosis for Instances of Linear Programming Blending Models", IMA Journal of Mathematics Applied in Business & Industry, 1992, pp. 163-210, vol. 4.

Greenberg, Harvey J., "The Use of the Optimal Partition in a Linear Programming Solution for Post-Optimal Analysis", Operations Research Letters, 1994, pp. 179-185, vol. 15, Issue 4.

Greenberg et al., "Approaches to Diagnosing Infeasible Linear Programs", ORSA Journal on Computing, 1991, pp. 253-261, vol. 3, No. 3.

Greenberg, Harvey J., "How to Analyze the Results of Linear Programs—Part 3: Infeasibility Diagnosis", Interfaces, Dec. 1993, pp. 120-139, vol. 23, Issue 6.

Greenberg, Harvey J., "Consistency, Redundancy, and Implied Equalities in Linear Systems", Annals of Mathematics and Artificial Intelligence, 1996, pp. 37-83, vol. 17, Issue 1.

Gregoire et al, 2009, "Using Local Search to find and MUSes", European Journal of Operational Research, 2009, pp. 640-646, vol. 199, Issue 3.

Guieu et al. "Analyzing Infeasible Mixed-Integer and Integer Linear Programs", INFORMS Journal on Computing, 1999, pp. 63-77, vol. 11, No. 1.

Jokar et al., "Exact and Approximate Sparse Solutions of Underdetermined Linear Equations", SIAM Journal on Scientific Computing, 2007, pp. 23-44, vol. 31, Issue 1.

Joormann et al., "On the Relation of Flow Cuts and Irreducible Infeasible Subsystems", Mar. 2014, 18 pages, http://www.optimization-online.org/DB_FILE/2014/03/4277.pdf. [Retrieved Nov. 2, 2016].

Liffiton et al., "Enumerating Infeasibility: Finding Multiple MUSes Quickly" Integration of AI and OR Techniques in Constraint Programming for Combinatorial Optimization Problems, vol. 7874 of the series Lecture Notes in Computer Science, 2013, pp. 160-175.

Liffiton et al., "Algorithms for Computing Minimal Unsatisfiable Subsets of Constraints", Journal of Automated Reasoning, Oct. 10, 2007, 42 pages, vol. 40, Issue 1.

Mahmoud et al., "Achieving MILP Feasibility Quickly Using General Disjunctions", Computers & Operations Research, Mar. 8, 2013, 21 pages, vol. 40, Issue 8.

Mangasarian, O.L., "Minimum-Support Solutions of Polyhedral Concave Programs", Mathematical Programming Technical Report 97-05, rev. Mar. 1998, 10 pages.

(56) References Cited

OTHER PUBLICATIONS

McCarl, Bruce A., "A Note on Fixing Misbehaving Mathematical Programs: Post-Optimality Procedures and GAMS-Related Software", Journal of Agricultural & Applied Economics, Dec. 1998, pp. 403-414, vol. 30, No. 2.

McCarl et al., "Validation of Linear Programming Models", Southern Journal of Agricultural Economics, Dec. 1986, pp. 155-164, vol. 18, Issue 2.

Murty et al., "Infeasibility Analysis for Linear Systems, a Survey", Arabian Journal of Science and Technology, 2000, 26 pages, vol. 25, No. 1C.

Parker, Mark Richard, "A Set Covering Approach To Infeasibility Analysis of Linear Programming Problems and Related Issues", Ph.D. thesis, 1995, 98 pages.

Petit et al., 2003, "A General Conflict-Set Based Framework for Partial Constraint Satisfaction", 5th International Workshop on Soft Constraint, 2003, 15 pages.

Pfetsch, Marc E., "The Maximum Feasible Subsystem Problem & Vertex-Facet Incidences of Polyhedra", PhD Dissertation, Oct. 21, 2002, 162 pages.

Pfetsch, Marc E., "Branch-And-Cut for the Maximum Feasible Subsystem Problem", SIAM Journal on Optimization, rev. May 2008, 21 pages, vol. 19, Issue 1.

Régin et al., "An Original Constraint Based Approach for Solving Over-Constrained Problems", Principles and Practice of Constraint Programming—CP 2000, Sep. 18-21, 2000, 5 pages.

Salvagnin, Domenico, "Constraint Programming Techniques for Mixed Integer Linear Programs", PhD Thesis, Jan. 25, 2009, 116 pages.

Savchynskyy et al., "Getting Feasible Variable Estimates From Infeasible Ones: MRF Local Polytope Study", 2013, 8 pages, http://hci.iwr.uni-heidelberg.de/Staff/bsavchyn/papers/savchynskyy-optprojection-iccv2013-workshop.pdf. [Retrieved Nov. 2, 2016].

Shah, I., "A Hybrid Algorithm for Finding Minimal Unsatisfiable Subsets in Over-constrained CSPs", International Journal of Intelligent Systems, 2011, 26 pages, vol. 26, Issue 11.

Vada, Jostein, "Prioritized Infeasibility Handling in Linear Model Predictive Control: Optimality and Efficiency", PhD Thesis, Feb. 2000, 116 pages.

Vada et al., "Efficient Infeasibility Handling In Linear MPC Subject To Prioritized Constraints", European Control Conference, 1999, 6 pages, http://www.itk.ntnu.no/databaser/artikler/vedlegg/189_pdf.pdf. [Retrieved Nov. 2, 2016].

Vada et al., 2001, "Linear MPC with Optimal Prioritized Infeasibility Handling: Application, Computational Issues and Stability", 2001, 18 pages, http://folk.ntnu.no/torarnj/ss0002-final.pdf?id=ansatte/Johansen_Tor.Arne/ss0002-final.pdf. [Retrieved Nov. 2, 2016].

Verfaillie et al., "Russian Doll Search for Solving Constraint Optimization Problems", Proceedings of the Thirteenth National Conference on Artificial Intelligence, Aug. 4, 1996, pp. 181-187.

Werner, Tomáš, "Revisiting the Linear Programming Relaxation Approach to Gibbs Energy Minimization and Weighted Constraint Satisfaction", IEEE Transactions on Pattern Analysis and Machine Intelligence, Jun. 26, 2009, 15 pages, vol. 32, Issue 8.

Chinneck et al., "Locating Minimal Infeasible Constraint Sets in Linear Programs", ORSA Journal on Computing, May 1991, pp. 157-168, vol. 3, No. 2, http://www.sce.carleton.ca/faculty/chinneck/docs/ChinneckDravnieks.pdf. [Retrieved Dec. 28, 2016].

Chinneck et al., "MIP Feasibility: Classic Methods", Lectures & Tutorials, 2000 to 2010, 178 pages, http://www.sce.carleton.ca/faculty/chinneck/docs/ChinneckLodiCIRRELT.pdf. [Retrieved Dec. 28, 2016].

Roodman, Gary M., "Post Infeasibility Analysis in Linear Programming Management Science", Management Science, 1979, pp. 916-922, vol. 25, No. 9, Institute for Operations Research and the Management Sciences (INFORMS), http://pubsonline.informs.org/doi/pdf/10.1287/mnsc.25.9.916. [Retrieved Jan. 4, 2017].

International Search Report and Written Opinion in International Application No. PCT/IB2015/059047, dated Mar. 29, 2016, 10 pages.

Dravnieks, Erik, "Identifying Minimal Sets of Inconsistent Constraints in Linear Programs: Deletion, Squeeze and Sensitivity Filtering", Carleton University dated Sep. 8, 1989, 126 pages.

\* cited by examiner

| Rule Name | Description | Scope | Number of bids in rule |
|---|---|---|---|
| \multicolumn{4}{l}{The following rules are contradictory} {602} | | | |
| R1 | Number of winners is at most 2 | Global | 321 |
| R2 | Number of winners per production country is at least 3 | France | 112 |
| \multicolumn{4}{l}{The following rule can never be fulfilled} {604} | | | |
| Rule Name | Description | Scope | Number of bids in rule |
| R17 | Allocation is at least 120 000 tons | Global | 321 |
| \multicolumn{4}{l}{The following rules are contradictory} {606} | | | |
| Rule Name | Description | Scope | Number of bids in rule |
| R3 | Divide allocation in proportions 70, 20, and 10% per country | USE, Inland | 23 |
| R12 | Allocate incumbents at least 50% of their volume | Bidder = Universal Transports | 6 |
| R13 | Reject all bids | Non-certified bidders | 3 |

FIG. 6

| | | Item | Total Price | Delivery Time (Days) |
|---|---|---|---|---|
| 1 | Cancel Submit | ☆ | Bananas FR | 540 123 | 17 |
| 2 | Cancel Submit | ☆ | Apples FR | 230 123 | 17 |
| 3 | Cancel Submit | ☆ | Bananas US | 783 234 | 13 |
| 4 | Cancel Submit | ☆ | Apples US | 376 123 | 13 |
| Items 1 to 4 of 4 | | | | |

| Rule | | Scope |
|---|---|---|
| ○ R1.1 | Number of winners at most  2.00 | Everywhere |
| ○ R2.1 | Allocation (%) is at least  75.00 | Bidders Demo Bidder 01 |
| ○ R3.1 | Allocation (%) is at least  5.00 | Bidders Demo Bidder 06 |
| ○ R4.1 | Allocation (%) is at least  5.00 | Bidders Demo Bidder 07 |

FIG. 9

| Index | Name | Status | Number of Winners | Payment (USD) |
|---|---|---|---|---|
| 1 | Cherry pick | Solved. 11/6/14 10:16:14 AM. | 3.00 | 2,017,246.00 |
| 2 | Max 2 winners | Solved. 11/6/14 10:16:15 AM. | 2.00 | 2,035,246.00 |
| 3 | Min 75% to bidder 1 | Solved. 11/6/14 10:16:15 AM. | 3.00 | 2,044,388.46 |
| 4 | Min 75% to bidder 1, 5% to each of bidder 6 & 7 | Solved. 11/6/14 10:16:15 AM. | 4.00 | 2,049,474.64 |
| 5 | Max 2 winners + Min 75% to bidder 1, 5% to each of bidder 6 | Infeasable. | | |

Scenario 5: Max 2 winners + Min 75% to bidder 1, 5% to each of bidder 6 & 7 | | Infeasible - No solution exists
---|---|---
| This Scenario | All Scenarios
Main Report | Individual Bidder Reports | Settings and Result Report | Infeasibility Resolution | Settings and Result Report
Generate | Generate | Generate | Solve from Reference Allocation  ☐ Infeasibility Analysis | Generate

FIG. 12 (1200)

| Index | Name | Status | Number of Winners | Payment (USD) |
|---|---|---|---|---|
| 1 | Cherry pick | Solved. 11/6/14 10:16:14 AM. | 3.00 | 2,017,246.00 |
| 2 | Max 2 winners | Solved. 11/6/14 10:16:15 AM. | 2.00 | 2,035,246.00 |
| 3 | Min 75% to bidder 1 | Solved. 11/6/14 10:16:15 AM. | 3.00 | 2,044,388.46 |
| 4 | Min 75% to bidder 1, 5% to each of bidder 6 & 7 | Solved. 11/6/14 10:16:15 AM. | 4.00 | 2,049,474.64 |
| 5 | Max 2 winners + Min 75% to bidder 1, 5% to each of bidder 6 & 7 | Inconsistent rules found. Solved with reference allocation: Zero. 11/6/14 12:25:36 PM | 2.00 | 2,062,388.64 |

| Bidder | 1. Cherry pick | | 2. Max 2 winners | | 3. Min 75% to bidder 1 | | 4. Min 75% to bidder 1, 5% to each of bidders 6 & 7 | | 5. Max 2 winners + Min 75% to bidder 1, 5% to each of bidders 6 & 7 | |
|---|---|---|---|---|---|---|---|---|---|---|
| | Allocation (%) | Payment (USD) | Allocation (%) | Payment (USD) | Allocation (%) | Payment (USD) | Allocation (%) | Payment (USD) | Allocation (%) | Payment (USD) |
| Demo Bidder 01 | 44.90 | 1,046,246.00 | 44.90 | 1,046,246.00 | 75.00 | 1,474,916.24 | 75.00 | 1,474,916.24 | 75.00 | 1,474,916.24 |
| Demo Bidder 06 | | | | | | | 5.00 | 68,480.63 | | |
| Demo Bidder 07 | 36.73 | 490,000.00 | 55.10 | 989,000.00 | 6.63 | 88,472.22 | 5.00 | 113,261.11 | 25.00 | 587,472.22 |
| Demo Bidder 13 | 18.37 | 481,000.00 | | | 18.37 | 481,000.00 | 15.00 | 392,816.67 | | |
| Sum | 100.00 | 2,017,246.00 | 100.00 | 2,035,246.00 | 100.00 | 2,044,388.46 | 100.00 | 2,049,474.64 | 100.00 | 2,062,388.46 |

INFEASIBILITY MANAGEMENT IN E-SOURCING SYSTEMS

PRIORITY INFORMATION

This application claims benefit of priority to U.S. Provisional Application Ser. No. 62/083,793, filed Nov. 24, 2014, which is hereby incorporated by reference in its entirety as though fully and completely set forth herein.

BACKGROUND OF THE INVENTION

Technical Field

This invention relates to improved systems and methods for e-sourcing.

Description of Related Art

E-sourcing (electronic sourcing) systems provide ways to electronically manage tenders where suppliers compete for the opportunity to provide products and/or services. E-sourcing systems may generally assist buyers in processes such as requesting bids and other information from bidders, evaluating different award scenarios based on received information, negotiating with bidders, deciding on an award of the business, and so on. When evaluating different award scenarios, buyers may take into account business policies, regulations, bidder-declared capacities, various conditions, discounts, and other factors. Further, there may be rules describing the underlying properties of the tender which can represent a complex supply chain. Advanced e-sourcing systems are designed to support the computing of allocations taking such rules into account. As an example, an allocation may represent a suggested award of contracts to one or more bidder.

As an example, Table 1 below depicts a sample set of rules:

TABLE 1

A sample set of rules.

| Rule Name | Description |
|---|---|
| R1 | Buyer: Allocate at most 10 suppliers in total. |
| R2 | Buyer: Allocate at most 3 suppliers per country. |
| R3 | Buyer: Allocate at most 3 suppliers per product. |
| R4 | Buyer: Allocate at most 1 supplier per country and product. |
| R5 | Buyer: Do not allocate any bidder more than 80% of its declared capacity. |
| R6 | Buyer: Do not allocate any bidder more than 20% of its yearly turnover. |
| R7 | Buyer: Allocate at least 75% of the volume to incumbent suppliers. |
| R8 | Buyer: Do not allocate bidder B1 country Co1 unless he is also allocated at least one of countries Co5, Co17 and Co21. |
| R9 | Buyer: If a printing facility is allocated in city Ci1, then the required amount of delivered paper must be allocated to Ci1. |
| R10 | Buyer: Divide allocations in proportions 70%, 20%, and 10% for each product. |
| R11 | Buyer: In Europe, allocate at most 3 bidders per country, unless I gain 100 000 USD per extra supplier and country. |
| R12 | Bidder: If I get at least 10 trucks allocated in at least 2 of western Nevada cities, I will give a 2.1% discount in California. |

In many cases, mixed integer programming can be used to solve complex sets of bids and rules when such rules can be expressed in linear terms. For example, the rules in the above example can be expressed as linear constraints. Other types of mathematical solvers such as Non-Linear Programming are also conceivable for use in an e-sourcing system. In cases where two or more rules are contradictory, a solution may not exist and a solver may report that the problem at hand is infeasible. Even with a small number of rules, such as a scenario including rules R1-R12 in Table 1, understanding which rules are contradictory can be difficult. For a buyer using an e-sourcing system in a situation with a much larger number of rules and conditions, understanding the source(s) of infeasibility and/or obtaining a "best effort" solution by relaxing some rules is a non-trivial task.

Scenarios, Rule, and Constraints

Throughout this document, the term "rule" generally refers to a relatively high level construct typically defined by, or presented to, a user on a display of a computing device or other device. For example, R8 presented above states "Do not allocate bidder B1 country Co1 unless he is also allocated at least one of countries Co5, Co17 and Co21." This represents a relatively high level, abstract, description of particular conditions. In this case, the rule is presented as a natural language description, readable by a human. In contrast, the term "constraint" may generally refer to a relatively low level construct used by a computer or mathematical model. For example, a constraint may take the form of an equation or inequality. In a typical case, a rule can be represented by one or more constraints, and relaxing a rule implies modifying or removing one or more related constraints.

The term "scenario" may refer to a set of rules, bids, and/or other data which together define an optimization problem for calculating an allocation. As such, a scenario may describe a particular alternative for awarding the business at hand. A scenario is infeasible if the resulting optimization problem is infeasible.

Mathematical Background

Infeasibility detection among a system of linear constraints (mixed integer or otherwise) has been an important topic for many years. The concept of an Irreducible Infeasible Set (IIS) or Irreducible Infeasible Subsystem (IIS) of constraints was defined as early as 1956 when Ky Fan published the paper "On Systems of Linear Inequalities" in "Linear Inequalities and Related Systems". However, despite the importance of the topic, very little progress was made in the development of a methodology to detect and resolve infeasibilities until the introduction of elastic programming in the 1970's, a technique that was described by G. G. Brown and G. W. Graves in their paper on "Elastic Programming: A New Approach to Large-Scale Mixed Integer Optimization" in 1975.

Since the 1970'sa number of techniques have been presented in an effort to identify infeasible sets of constraints. Such methods include branch-and-bound, constraint addition, cycle generation, deletion filtering, dual/shadow prices, elastic programming, feasible system polytopes, IIS hypergraphs, hypothesis generation, sensitivity filtering, set covering, successive bounding, ranking and weighting.

Furthermore, it should also be noted that the IIS hypergraph and polytope methods may not be applicable as they require the formulation of the problem as a hyper-graph or a polytope-mathematical constructs that are difficult for even trained mathematicians to visualize and beyond the ability of most commercial (mixed integer) linear programming solvers to handle.

However, the inventors have determined that there are methods that could be relevant for real-world domain problems, and which could be applied to the domain of e-Sourcing. For example, constraint addition starts with an unconstrained problem and incrementally adds constraints to the problem, one at a time, until the problem is infeasible. The resulting set of constraints is guaranteed to be irreducible, but is not guaranteed to be the smallest irreducible set.

Another method that may be applied is deletion filtering. In deletion filtering, constraints are removed from an infeasible model one by one until the model is feasible. The remaining set of constraints with the last deleted constraint is an infeasible set. However, the base method has a number of shortcomings. The method typically only finds one infeasible set, which is not necessarily minimal. And, like constraint addition, it does not necessarily tell the user why the set is infeasible.

Branch-and-Bound, an extension of the depth first search algorithm, incrementally builds a tree structure using the constraints, starting from an empty set, such that the left child of a node at each level represents the set of constraints without the constraint associated with the level and the right child of a node at each level represents the set of constraints with the constraint associated with the level. If there are n constraints, the tree will have n levels and the leaf level will contain all of the (2 to the power of n) subsets of constraints. The algorithm works by traversing the tree down the rightmost side until an infeasible set of constraints is found, and then searching left until a minimal such set is found. This is essentially a modified form of constraint addition, and while it can be altered to find multiple infeasible sets, and infeasible sets of minimum size, this requires tracing out a subtree of exponential size and the method becomes impractical as an exponential number of models, which could each require a large processing time, have to be solved.

Set Covering, in infeasibility analysis, picks random points that represent valid solutions to an unconstrained model and then tests each constraint against that point. If the constraint is violated, it is added to a set of unsatisfied constraints. The set of all such unsatisfied constraints is an infeasible set because it prevents a solution at that particular point. However, the set of constraints produced is not guaranteed to be an irreducible set of constraints, as some constraints in the set could make others unnecessary. In addition, the base model has to be solved and one or more feasible points in the base model identified to use this method.

Infeasibility in E-Sourcing

For discussion of prior art methods in e-sourcing and comparisons to the embodiments described herein, we will use a small example for which the source of infeasibility is quite apparent. Furthermore, for the purpose of discussing prior art methods, we assume that a priority has been assigned to each rule.

TABLE 2

A small set of contradicting rules.

| Rule name | Description | Priority |
|---|---|---|
| R1 | Allocate at least 4 units | High |
| R2 | Allocate at least 3 units to incumbents | Low |
| R3 | Allocate at most 2 units | Medium |

In Table 2 above three rules (R1-R3) are presented, each having an associated priority. It is assumed that each of the three rules can be satisfied in isolation, e.g. that there are bids for at least 3 units from incumbents (i.e., current suppliers).

As can be seen in Table 2, R1 (at least 4 units) and R3 (at most 2 units) cannot both be satisfied simultaneously Similarly, R2 and R3 cannot both be satisfied simultaneously.

However, inspecting the priorities, a possible solution can be identified. As R1 has higher priority, R3 may be relaxed. In this manner, a feasible solution is obtained in which both R1 and R2 are satisfied and R3 is relaxed (i.e., is not satisfied). For example, a possible solution may be allocation of 4 units, with 3 of the 4 being allocated to incumbents. While R3 is not satisfied, this solution may be deemed the most attractive feasible alternative given that R1 has priority over R3.

The idea of relaxing rules to obtain a feasible solution exist in prior art, but with limitations and weaknesses. For example, methods have been described in which different rules are assigned priorities are gradually relaxed until a feasible solution is found. Such methods are, however, limited and do not necessarily lead to a good relaxation of rules.

What is, therefore, needed and not disclosed in the prior art are methods and systems to assist users in efficiently managing infeasibility resolution in e-sourcing that can also be used in complex situations.

SUMMARY OF EMBODIMENTS

In one embodiment, a system is contemplated that is configured to manage tenders in an electronic system. The system is configured to receive input from users, such as input from bidders. Such input may comprise bids, questions, and/or other data related to tenders. In addition, the input may include allocation rules that describe a desired property of an award of one or more items on which the bidder is bidding. Responsive to receiving the input, the system builds a model to determine allocations based on received bids. The model includes constraints based at least in part on allocation rules provided by bidders. Responsive to attempting to solve the model, the system may identify one or more irreducible infeasible sets of constraints in the model that prevent a successful allocation. In one embodiment, the system is configured to compare the allocation rules to a reference allocation. In response to determining an allocation rule of the allocation rules is in conflict with the reference allocation, the system is configured to relax the allocation rule in the first optimization model to create a second optimization model, and solve the second optimization model to generate an allocation compatible with the second optimization model. In various embodiments, relaxing the allocation rule comprises omitting the allocation rule.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 6 illustrates one embodiment of an infeasibility analysis report.

FIG. 8 illustrates one embodiment of a web interface.

FIG. 9 illustrates one embodiment of a sample set of rules.

FIG. 10 illustrates one embodiment of a list of scenarios.

FIG. 11 illustrates one embodiment of a web page displaying details of a scenario.

FIG. 12 illustrates one embodiment of a list of scenarios.

FIG. 13 illustrates one embodiment of an allocation report.

DESCRIPTION OF EMBODIMENTS

Figure 1A:
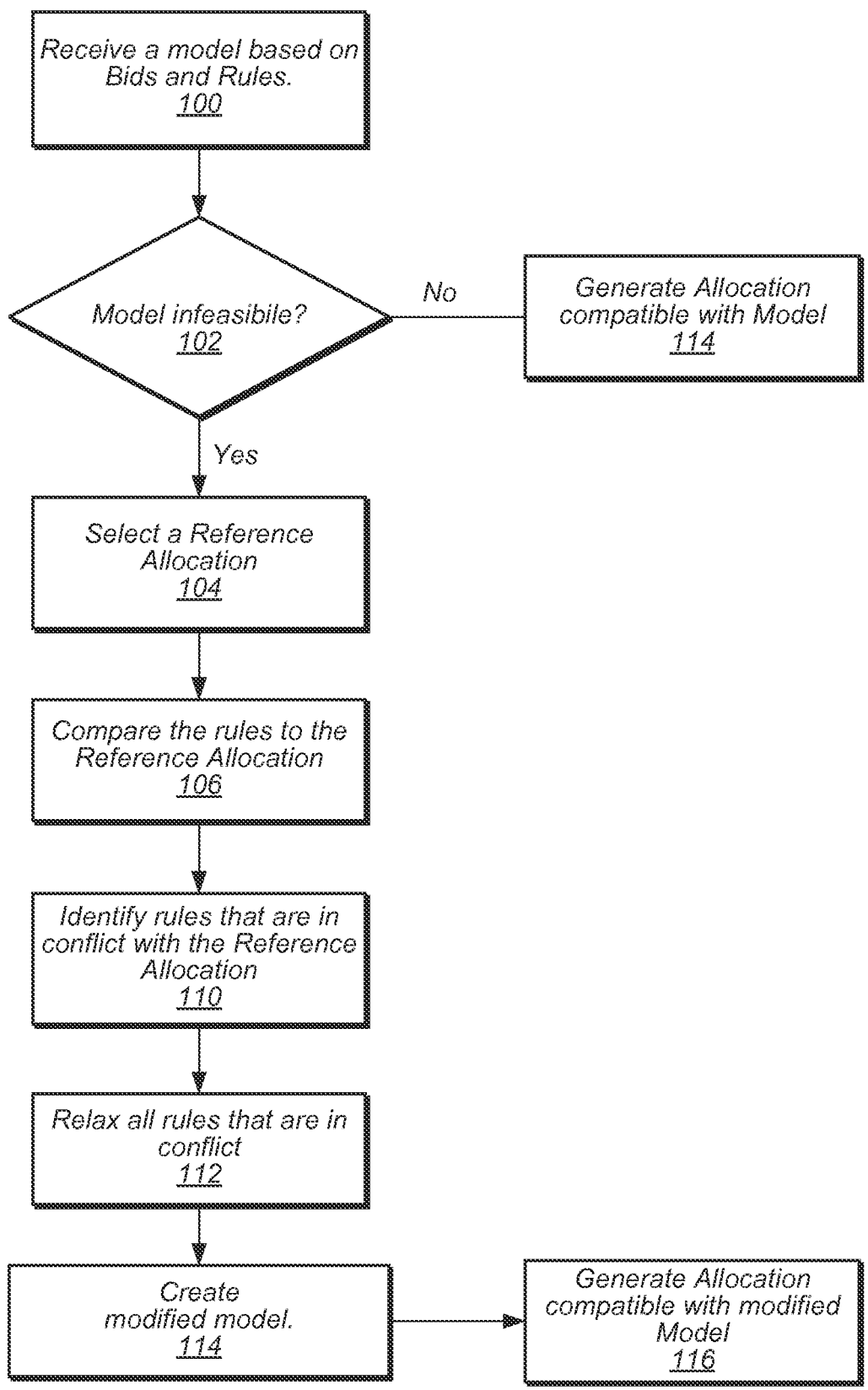
FIG. 1A illustrates one embodiment of a method for determining an allocation.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

While the techniques described herein are susceptible to various modifications and alternative forms, specific embodiments thereof are shown by way of example in the drawings and will herein be described in detail. It should be understood, however, that the drawings and detailed description thereto are not intended to limit the techniques to the particular form disclosed, but on the contrary, the intention is to cover all modifications, equivalents and alternatives falling within the spirit and scope of the present embodiments as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Further, the use of the word "may" generally indicates that the feature discussed may or may not be present in various embodiments. Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a display control unit . . . ." Such a claim does not foreclose the system from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

In practical sourcing situations, buyers are typically faced with a significant number of business rules. In addition to this, the bidders often have other considerations such as capacity limitations, synergies, etc. In a sourcing system supporting these types of rules, there are often a rather large number of rules used in analyzing different scenarios for awarding the business. Sometimes rules may be contradictory. When the number of rules is large and/or there are many items, bids, bidders, etc., it can be very cumbersome to resolve such contradictions, and some tool for infeasibility resolution is highly desired. There at least two aspects of infeasibility resolution:

1. Obtain a feasible solution by relaxing some of the rules, preferably with small efforts from the buyer.
2. Providing information about the source(s) of infeasibility.

For ease of discussion, we will discuss "a buyer"/"the buyer" as an entity which defines rules, resolves infeasibility, etc. However, it is to be understood that in practice there may be one or more buyers, one or more groups of buyers, one or more buying organizations, etc. This "buyer" may also be referred to as a manager, user, or otherwise. The specific term used should not be seen as limiting the invention. For example, sometimes in the literature the party controlling a bidding process is also called bid taker. The solutions described herein can also be used outside of e-Sourcing and buying, in which cases, the term "buyer" can be replaced by a more appropriate term, such as Manager. Examples are resource planning, scheduling, exchanges, selling, etc. In addition, in various embodiments bids may correspond to goods, services, other tangibles and/or intangibles, or any combination of the foregoing. Numerous such alternatives are possible and are contemplated.

It is noted that while the following discussion is centered on e-sourcing, the methods and mechanisms described herein may be used in areas outside of e-sourcing. For example, the systems and methods may be used for planning, supply chain optimization, and other optimization areas. Furthermore, the entity setting the rule need not represent a buyer, it may just as well be a bidder, analyst or otherwise.

Overview of a System for Infeasibility Resolution

Obtaining a Feasible Solution in the Presence of Contradictory Rules

As described herein, a "reference allocation", or "reference point", represents a potential allocation or solution. For example, such an allocation or solution may be the result of solving a scenario or it may be a predefined allocation. Alternatively, it may simply be a description of an allocation, such as "allocate the lowest bid for each item". It is noted that a reference allocation does not need to represent a feasible solution to any specific scenario.

A reference allocation may be used in many different ways. For example:
1. If all rules violated by the reference allocation are identified, and all identified rules are relaxed, a feasible problem is generated.
2. Information about violated rules can be useful for a buyer in evaluating why he is unable to obtain an expected allocation, or to guide the buyer in setting priorities for one or more rules.

FIG. 1A illustrates one embodiment of a method for determining an allocation. In the example shown, a model is received that is based on bids and rules (block 100). For example, suppliers may provide bids on one or more items that wish to supply with the bids representing the price at which they will supply (sell) the items. Rules regarding allocations (i.e., the awarding of contracts to suppliers based on their bids) are also received. Such rules may specify requirements on how the allocation is to be made. Using the received bids and rules, an optimization model is received (or otherwise generated). Generally speaking, the model may comprise a system of equations as described herein that includes constraints based on at least the received rules.

Having received the model, a determination is made as to whether a solution exists (i.e., is the model feasible) (block 102). If the model is feasible, then an allocation may be generated based on a solution of the model (block 114). However, if the model is infeasible, then a reference allocation is selected by the user or system (block 104). In various embodiments, the reference allocation is an initial allocation made without regard to the allocation rules that have been received. In this sense, the reference allocation may be viewed as a default allocation. For example, such a reference allocation may be a Zero allocation in which no awards are made. Alternatively, a reference allocation may simply award the lowest bid for each item. Other reference allocations may be based on previously determined allocation and/or solution to a model. These and other reference allocation will be discussed further below.

Having made the reference allocation, a determination is then made as to whether any of the received allocation rules, have been violated. Generally speaking, each rule is examined and compared to the reference allocation to determine if the rule is violated (block 106). In this manner, each of the rules that are violated are identified (block 100). Having identified all rules that are violated by the reference allocation, all of the identified rules (in some embodiments) are relaxed (block 112). In some embodiments, relaxing a rule may include complete removal of the rule. In other embodiments, relaxing of a rule may include reducing constraints imposed by the rule. For the purposes of discussion here, removal of the rule will be described. The comparison of rules against the reference allocation and the relaxation of the rules can be done at different levels, for example on a data structure directly representing the rule(s) or on an equation in an optimization model dependent on how data is received and processed in various embodiments. As used herein, the expression "relaxing a rule" and similar expressions may refer to a direct modification of rules, modification of a representation of rules (e.g., in equations used to represent such rules), modification of data structures used to represent rules, and so on.

Once the identified rules that violate the reference allocation have been removed, the optimization model is then modified so that is reflects removal of these rules (block 114). Given the modified model, a new allocation is generated that is compatible with the modified model and a solution has now been obtained (block 116).

Figure 1B:
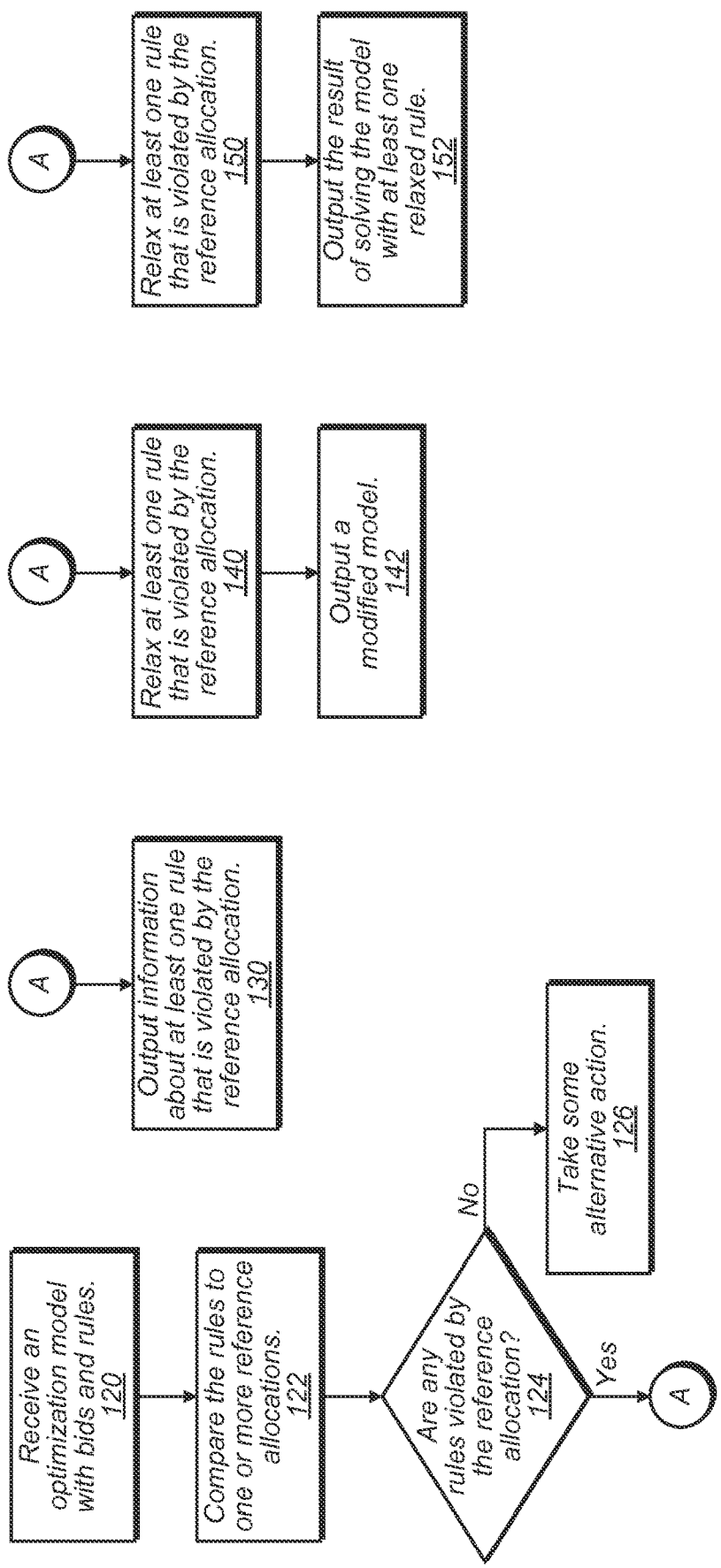
FIG. 1B illustrates various embodiments of a method for determining whether rules violate a reference allocation and taking a responsive action.

FIG. 1B, illustrates various method to identify and relax a sub-set of rules, based on one or more reference allocations. In the example shown, a reference allocation is used to obtain different results: (i) information about relaxed rules, (ii) a modified model, or (iii) a solution to the modified model. In block 120, an optimization model including associated bids and rules is received. Generally speaking, as described herein, the optimization model may include a system of equations based on bids and rules. However, the discussion may simply describe the optimization and including or comprising bids and/or rules. The received rules are then compared to one or more reference allocation (block 122), and a determination is made as to whether any of the rules are violated by the one or more reference allocations (decision block 124). If no rules are violated, then some other action may be taken (block 126). However, if a rule violation is detected, then one or more actions (denoted A) may occur.

In one embodiment, information about at least one rule that is violated by the reference allocation may be output (block 130). Another possibility is to relax at least one rule that is violated by the reference allocation (block 140), and a modified model based on the relaxed rule generated and/or output (block 142). Yet another possibility is to relax at least one rule that is violated by the reference allocation (block 150), and output a result of solving the model using the relaxed rule (block 152). The comparison of rules against the reference allocation and the relaxation of the rules can be done at different levels, for example on a data structure directly representing the rule or on an equation in an optimization model dependent on how data is received and processed in various embodiments.

Elastic programming is a method for handling infeasibility in mathematical programming in which constraints may be broken with a penalty and the solver may then include these violation penalties in the objective. Using such a method, each constraint can be violated and is penalized as a function of the magnitude of the deviation. In other words, a constraint may not need to be completely omitted. Rather a constraint may be violated to different degrees at a cost. For example, assume the following linear problem:

| Minimize: | $2x + y$ | |
| --- | --- | --- |
| Subject to: | $x \geq 1$ | (1) |
| | $y \geq 2$ | (2) |
| | $x + y \leq 1.5$ | (3) |
| Where: | $x \in [0, 1]$ | |
| | $y \in [0, 2]$ | |

Applying elastic programming to constraints (1) and (2) may give:

| Minimize | $2x + y + 100e_1 + 100e_2$ | |
| --- | --- | --- |
| Subject to | $x + e_1 \geq 1$ | (1) |
| | $y + e_2 \geq 2$ | (2) |
| | $x + y \leq 1.5$ | (3) |
| Where: | $x, e_1 \in [0, 1]$ | |
| | $y, e_2 \in [0, 2]$ | |

The solution to the elastic version is $x=0$ and $y=1.5$, with $e_1=1$ and $e_2=0.5$ giving a total violation cost at 150.

Elastic programming is a means to relax a rule in various embodiments—when the scenario is modelled using mathematical programming and elastic programming is applied to one or more rules representing the rule. As described herein, we provide a modified form of elastic programming. For this purpose, we introduce the term EP*. Applying EP* is defined as one or more of the following:

(i) Applying elastic programming to relax one or more constraints in a mathematical programming problem representing some part of a scenario.
(ii) Omitting the representation of some part of a scenario or rule in the mathematical programming model.
(iii) Changing the scope or limit of a rule.

Omitting (parts of) the rule in the mathematical program can essentially be thought of as corresponding to using elastic programming with a rule violation penalty of zero, but technically, just omitting the rule may be more practical. For simplicity and readability, the description of EP* is based on the case where a penalty (if used) is proportional to the deviation from the rule, and where rules can be omitted. Other variants are possible and are contemplated, such as using a penalty if the rule is broken and then adding no further penalty based on degree of deviation, using combinations of different such penalties, or use penalties based on combinations of deviations of different rules. The variants described here are exemplary only and should not be seen as limiting.

In EP*, a rule violation penalty can be a fixed number, user-defined, derived by the system, or otherwise. One alternative would be to use a user-defined value whenever defined, and a system default value otherwise. The variant above that obtains a feasible problem by applying EP* to all rules that are violated by the reference point problem is denoted AutoRelaxByAlloc. The mathematical programming problem resulting from AutoRelaxByAlloc is feasible as there is at least one feasible solution: the solution corresponding to the reference allocation.

Figure 2:
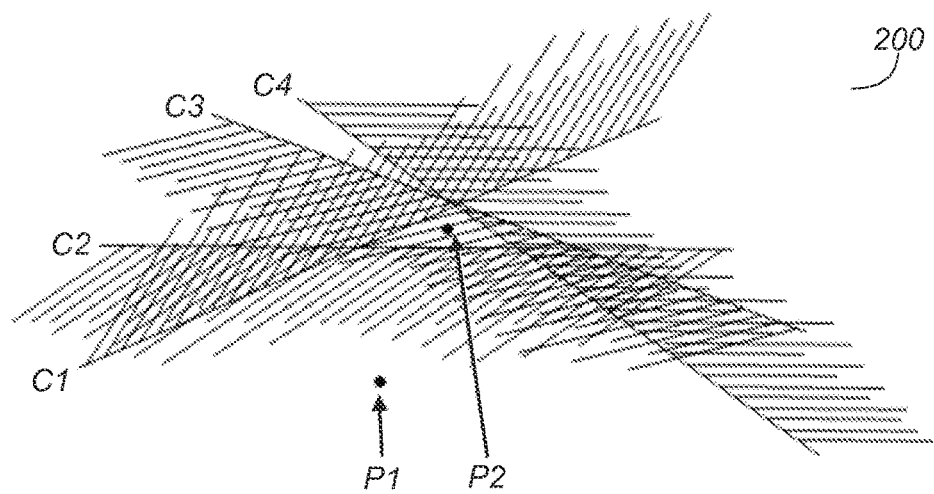
FIG. 2 illustrates an infeasible two-dimensional problem with four constraints.

AutoRelaxByAlloc is now described in a small example. In FIG. 2, an infeasible two-dimensional problem with four constraints (C1-C4) is shown. We also show two reference points, P1 and P2, which may correspond to reference allocations for a corresponding scenario. As can be seen, P2 is not feasible due to constraint C3, and P1 is not feasible due to either of constraints C2 and C3.

Figure 3:
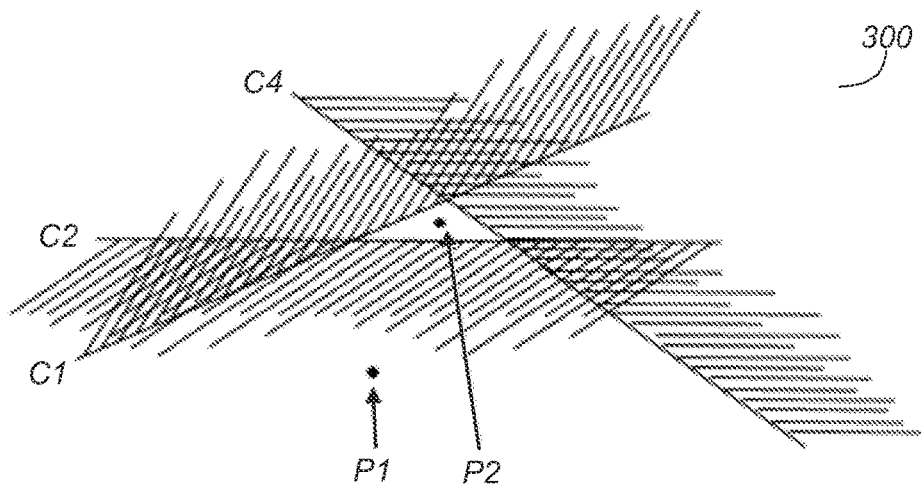
FIG. 3 illustrates the problem of FIG. 2 after relaxation of a constraint.

Next, in FIG. 3, AutoRelaxByAlloc with reference point P2 has been applied. In order to make P2 feasible, EP* has been applied on C3 (here the constraint C3 has been relaxed, and removed from the figure). P2 is now a feasible solution, and there is a region around P2 which is also feasible. For the case that the rule violation penalty applied by EP* on C3 is high enough, the solver will return the solution being the top corner of the triangle forming the feasible region around P2, as this may be deemed to violate C3 the least.

Figure 4:
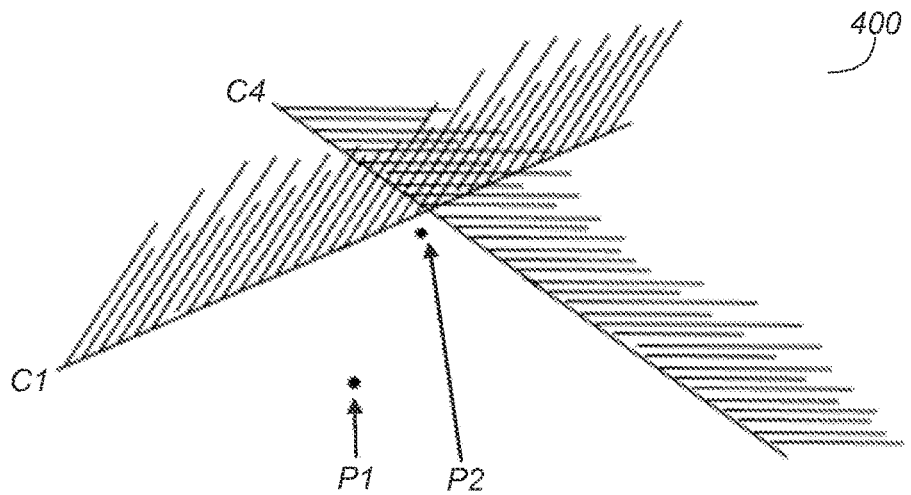
FIG. 4 illustrates the problem of FIG. 3 after relaxation of an additional constraint.

In FIG. 4, the reference point P1 is used. For this case, EP* is applied and both C2 and C3 are relaxed, and there is a larger feasible region. The AutoRelaxByAlloc method can hence be used to conveniently obtain a feasible solution with minimum input from the buyer, or allowing the buyer to set penalties at a detailed level if so desired.

In various embodiments, AutoRelaxByAlloc can be invoked on request, for example when the buyer has been informed that his original scenario was infeasible, performed automatically by the system as soon as a solve attempt concludes that the problem is infeasible, or be triggered by some other event. Once the allocation is obtained, it can be reported by the system in various ways. This can include all types of reports on the allocations and payments as well as reports on deviations from limits of the relaxed rules.

Based on the above discussion, below is a sample description of a bidding and allocation process. It is noted that the presented example is relatively simple for purposes of discussion. Those skilled in the art will appreciate that in various situations there may be many more bidders, items and rules than discussed below. In this example there are two bidders that are bidding to serve as supplier for five items. The illustrated bid prices (100-104 and 90-94) in this table are arbitrary and are provided simply for purposes of discussion. Each bidder has provided bids for supplying the items as follows:

TABLE 4

Supplier Bids

| | Bidding Suppliers | |
| --- | --- | --- |
| Items | Incumbent Supplier Bid (Dollars) | New Supplier Bid (Dollars) |
| Item 1 | 104 | 90 |
| Item 2 | 103 | 91 |
| Item 3 | 102 | 92 |
| Item 4 | 101 | 93 |
| Item 5 | 100 | 94 |

In table 4 above, Incumbent Supplier and New Supplier have each provided bids for the sale of each of five items, Item 1-Item 5. In this example, we assume that the objective of the optimization is to minimize cost, though other objectives are possible and are contemplated. In this example, the cost of an item is defined as either (i) the payment to the allocated bid as stated in the bid, or (ii) 10,000 per non-allocated item if an item is not allocated. For example, if Item 1 is not allocated in a given allocation, then a cost of 10,000 is applied. If Items 1 and 2 were not allocated, then a cost of 2=10,000=20,000 would be applied, and so on. As with the above bids, the penalty mentioned here (10,000) is simply provided for purposes of discussion. In this embodiment, there is no penalty associated with violation of an omitted rule (discussed in greater detail below). Rather, omitted rules are ignored and treated as though they do not exist. However, as will be further described below, penalties associated with rules that are made elastic may also be included in the cost and in some embodiments such costs could be associated with omitted rules as well if desired With no other rules present, the minimum cost occurs if the bids from New Supplier (the lowest bidder on all items) are allocated on all five items, resulting in a total cost of 90+91+92+93+94=460.

Next, assume that a buyer has defined a scenario S, including the rules of Table 2, to be used in the allocation calculation. Hence scenario S contains:

| Rule name | Description |
|---|---|
| R1 | Allocate at least 4 units |
| R2 | Allocate at least 3 units to incumbents |
| R3 | Allocate at most 2 units |

On review of the above rules it can be seen that scenario S is not feasible. For example, R1 and R3 cannot both be satisfied as R1 requires allocation of at least 4 units and R3 requires allocation of at most 2 units. In some embodiments, detection of such an infeasibility may include responding in one or more of a variety of ways—such as by producing a report when an attempt to calculate allocations is made.

We will now describe six different embodiments for resolving the infeasibility of scenario S. The described embodiments are based on three different reference allocations and two relaxation methods, resulting in six combinations. It is noted that many possible reference allocations and relaxation methods are possible based on a variety of business considerations. These and other reference allocations and methods are possible and are contemplated. It is also noted that techniques to resolve infeasibility may be done after infeasibility has been detected, or such techniques may be applied without testing or knowledge of whether or not the allocation calculation is infeasible. Resolution of an infeasibility can be triggered manually or automatically. These, and other variants are possible and contemplated. As will be seen, the described methods and mechanisms may provide a highly efficient approach for determining a lowest cost allocation within the context of given conditions.

First, we describe three different reference allocations (as shown in Table 5) for use in resolving infeasibilities. In the table below, a "1" indicates that the supplier has been allocated the corresponding item(s) and a "0" indicates that the supplier has not been allocated the corresponding item. It is noted that other types of allocations such as split allocations, over-allocations, partial allocations, etc., are also possible and contemplated, but are not described in this example for ease of discussion. In addition, while three different reference allocations and two different relaxation methods are discussed, a given process may only use one type of reference allocation and relaxation method. However, embodiments are possible where multiple approaches may be used either in parallel or according to some sequence.

TABLE 5

| | Reference Allocations | | | | | |
|---|---|---|---|---|---|---|
| | Reference Allocation A | | Reference Allocation B | | Reference Allocation C | |
| | Incumbent Supplier | New Supplier | Incumbent Supplier | New Supplier | Incumbent Supplier | New Supplier |
| Item 1 | 0 | 0 | 0 | 1 | 1 | 0 |
| Item 2 | 0 | 0 | 0 | 1 | 1 | 0 |
| Item 3 | 0 | 0 | 0 | 1 | 1 | 0 |
| Item 4 | 0 | 0 | 0 | 1 | 1 | 0 |
| Item 5 | 0 | 0 | 0 | 1 | 1 | 0 |

As seen from the above in Table 5, reference allocation A is allocating nothing to each supplier, reference allocation B is allocating each item to the lowest bid (i.e., New Supplier in this example), and reference allocation C is allocating each item to Incumbent Supplier. In the embodiments of this example, the reference allocations are defined without regard to any specific allocation rules defined by the buyer. In various embodiments, such reference allocations may be pre-defined in the sourcing platform. In other words, it may be predetermined that a given reference allocation to be used is to "allocate nothing", "allocate lowest bid", "allocate incumbent supplier", or otherwise. In other embodiments, a reference allocation to be used may be based on some rules or conditions, and/or may be the result of earlier allocation calculation(s).

As noted above, in addition to three reference allocations, two relaxation methods may be used: (i) omit all violated rules, and (ii) apply elastic programming to (representations of) violated rules with a penalty for violation of the rule. As an example, a penalty of 100,000 per unit for violation of a rule may be applied. So, for example, if a rule requiring allocation of at least 4 units is violated and the allocation is of 2 units, then the rule is violated by a measure of 2 units which incurs a penalty of 2×100,000=200,000. Similarly, if an allocation of 7 units were made, then the rule would be violated by a measure of 3 units which would incur a penalty of 3×100,000=300,000. The penalty of 100,000 is an example only. Different penalties may be used in different embodiments. Penalties may also vary between different rules to reflect some type of priorities. Given the above descriptions of the reference allocations and relaxation methods, we now describe the resulting six combinations as shown in Table 6.

TABLE 6

Six sample embodiments for resolving infeasibility of scenario S.

| Embodiment | Reference Allocation | Relaxation method |
|---|---|---|
| 1 | A | Omit |
| 2 | A | Elastic |
| 3 | B | Omit |
| 4 | B | Elastic |
| 5 | C | Omit |
| 6 | C | Elastic |

In each of the six embodiments, resolving infeasibility includes identifying which rules are violated by the reference allocation used in the give embodiment.

In embodiments 1 and 2, we use reference allocation A. By comparing the above rules to reference allocation A, we can see that rules R1 and R2 are violated. R1 is violated as it requires the allocation of at least 4 units, but reference allocation A allocates 0 units. R2 is violated as it requires allocation of at least 3 units to incumbents and reference allocation A allocates 0 to incumbents. Rule R3 is not violated as it requires allocation of at most 2 units and reference allocation A allocates 0 units.

In embodiments 3 and 4, we use reference allocation B. By comparing the above rules to reference allocation B, we can see that rules R2 and R3 are violated. R2 is violated as it requires allocation of at least 3 units to incumbents and reference allocation B allocates 0 units to incumbents. R3 is violated as it requires allocation of at most 2 units and reference allocation B allocates 5 units. Rule R1 is not violated as it requires allocation of at least 4 units and reference allocation B allocates 5 units.

In embodiments 5 and 6, we use reference allocation C. By comparing the above rules to reference allocation C, we can see that R3 is violated as it requires allocation of at most 2 units and reference allocation C allocates 5 units. R1 is not violated as it requires allocation of at least 4 units and reference allocation C allocates 5 units. R2 is not violated as it requires allocation of at least 3 units to Incumbent Supplier and reference allocation C allocates 5 units to Incumbent Supplier.

Table 7 below summarizes the comparisons between the above described rules and reference allocations.

TABLE 7

Rule Violations

| | Reference Allocation A | Reference Allocation B | Reference Allocation C |
|---|---|---|---|
| R1 | Violated | Not violated | Not violated |
| R2 | Violated | Violated | Not violated |
| R3 | Not violated | Violated | Violated |

In each of the six embodiments, having identified which rules are violated by a given allocation, the violated rules are relaxed. As described above in Table 6, the relaxation methods used by the example embodiments are to either to omit violating rules ("Omit") or make them elastic with a penalty ("Elastic"). In various embodiments when using an Elastic relaxation method, allocations may seek to minimize the penalty associated with violation of Elastic rules when possible. As a result of the relaxation, we may say that we have a relaxed version, Scenario Relaxed ("SR"), of scenario S.

Following relaxation, a new allocation calculation is made based on SR. The result is shown in Table 8 where "Incumbent Supplier" is abbreviated as "Inc", and "New Supplier" is abbreviated "New".

In embodiment 1, the violated rules R1 and R2 are omitted. R3 (allocate at most 2 units) remains and limits the total allocation to 2 items, leaving 3 items unallocated at a cost 3×100,000=30,000 (penalty for non-allocation of items). As noted above, the objective in these discussed scenarios is to minimize cost. Therefore, 2 items (Item 1 and Item 2) are allocated to the lowest bid (i.e., New Supplier), resulting in a total cost of 90+91+3×10 000=30,181. Accordingly, by using the reference allocation discussed above, rules that prevent a feasible solution are readily identified and removed, and a feasible solution is determined in an efficient manner Given the conditions of the scenario and embodiment, the resulting total cost of the solution is guaranteed to be a lowest cost solution which may be deemed optimal in the given context. As will be seen in the following, the other embodiments likewise provide a very efficient approach to determining a solution to what was originally determined to be infeasible.

In embodiment 2, the violated rules R1 and R2 are made elastic with a penalty of, for example, 100,000. R3 remains and serves to limit the total allocation to 2 items which will leave 3 items unallocated at cost 3×10,000=30,000. Regardless of which of the 2 items we allocate, allocation of 2 items will result in R1 (allocate at least 4 units) being violated by 2 units at a cost of 2×100,000=200,000. Therefore, R1 will have no impact on which items are allocated. However, to minimize the impact of violating the elastic version of rule R2 (allocate at least 3 units to incumbent), the 2 units to be allocated will be allocated to Incumbent Supplier. Therefore, R2 will still be violated by 1 unit at a cost/penalty of 100,000. To minimize cost (according to the present scenario and embodiment), items 4 and 5, having the lowest bids, are allocated to the incumbent supplier at a total cost of 101+100+3×10,000+2×100,000+100,000=330,201.

In embodiment 3, rule R1 remains unchanged and rules R2 and R3 are omitted. The solver can hence allocate all items at lowest cost. As a result, all items are allocated to New Supplier at cost 90+91+92+93+94=460.

In embodiment 4, rule R1 remains and rules R2 and R3 are made elastic with a penalty of 100,000. With reasoning analogous to the above it can be seen that the lowest cost solution is to allocate Item 1 to New Supplier, and Items 3, 4 and 5 to Incumbent Supplier. The cost includes a penalty of 0 for R2, 200,000 for R3, and 10,000 for one unallocated item. Therefore, the total cost is 90+102+101+100+10,000+200,000=210,393.

In embodiment 5, rules R1 and R2 remain and rule R3 is omitted. The resulting allocation is Item 1 and 2 to New

TABLE 8

Allocations for scenario SR in six example embodiments.

| | Embodiment 1 | | Embodiment 2 | | Embodiment 3 | | Embodiment 4 | | Embodiment 5 | | Embodiment 6 | |
|---|---|---|---|---|---|---|---|---|---|---|---|---|
| | Inc | New | Inc | New | Inc | New | Inc | New | Inc | New | Inc | New |
| Item 1 | 0 | 1 | 0 | 0 | 0 | 1 | 0 | 1 | 0 | 1 | 0 | 1 |
| Item 2 | 0 | 1 | 0 | 0 | 0 | 1 | 0 | 0 | 0 | 1 | 0 | 0 |
| Item 3 | 0 | 0 | 0 | 0 | 0 | 1 | 1 | 0 | 1 | 0 | 1 | 0 |
| Item 4 | 0 | 0 | 1 | 0 | 0 | 1 | 1 | 0 | 1 | 0 | 1 | 0 |
| Item 5 | 0 | 0 | 1 | 0 | 0 | 1 | 1 | 0 | 1 | 0 | 1 | 0 |

Supplier, and Items 3, 4, and 5 to Incumbent Supplier, resulting in a total cost of 90+91+102+101+100=484.

Finally, in embodiment 6, rules R1 and R2 remain and rule R3 is made elastic with a penalty of 100,000. This results in the same allocation and cost as for Embodiment 4.

As seen above, the role of the reference allocation in these example embodiments is to determine what rules to relax. Once that has been done, the reference allocation may have no further role in these embodiments.

In addition to the above, the methods and mechanisms described herein can also be used iteratively. Assume for example we refer to the set of rules for scenario S1 as $R_{S1}$ and an allocation to scenario S1 as $A_{S1}$.

A sample process may be as follows:
1) The buyer sets up a scenario, termed "BASE", in which $R_{BASE}$ expresses one or more rules of the current tender. Examples of such rules can be balance rules between different parts of a supply chain: for example in order to enable the allocation of a certain production bid, matching allocations of required raw material bids must also be allocated.
2) Scenario BASE turns out to be infeasible. The buyer then uses the above described method using zero allocations (allocate nothing) as a reference allocation(s). The resulting allocation, $A_{BASE}$, is concluded acceptable, even though it may be that case that, for example, a minor set of the desired sourced items cannot be bought as part of the current tender.
3) The buyer sets up a second scenario, termed "AsIs". This scenario uses all rules of the rule set $R_{BASE}$ which are not violated by the new reference allocation $A_{BASE}$. This set of rules is named $R'_{BASE}$. The buyer then adds one or more rules that indicate incumbent suppliers should maintain their incumbent allocations as specified by $A_{BASE}$.
4) The second scenario, AsIs, turns out to be infeasible. The buyer then uses one of the methods and/or mechanisms described herein to solve the scenario with $A_{BASE}$ as a reference allocation. As a consequence, all rules requiring that incumbents should keep their shares which are in conflict with $A_{BASE}$ are relaxed. A new allocation is then made, $A_{AsIs}$. On running different reports on $A_{AsIs}$ the buyer may detect that all expected AsIs allocations may not be fulfilled because all the incumbents had not rebid on all of their current contracts. The buyer might then want to contact selected incumbents and encourage them to rebid and then rerun the AsIs scenario. It may also/alternatively be the case that AsIs reveals problems in the set-up of BASE and that $R_{BASE}$ rules need corrections and the process should restart at step 1. Once $A_{AsIs}$ is determined to be acceptable, the buyer continues to step 5.
5) The buyer sets up a third scenario, termed "Preferred", which uses the rules of $R'_{BASE}$ plus one or more other rules (e.g., preferred business rules). Assume also that scenario Preferred is infeasible. The buyer then uses the methods and/or mechanisms described herein with $A_{AsIs}$ as a reference allocation. Note that the buyer in this example made a choice to start from $R'_{BASE}$ rather than $R_{AsIs}$. This means that the particular rules of keeping incumbent allocations introduced in the AsIs scenario are not enforced, but that $A_{AsIs}$ is a feasible solution and that the rules introduced for scenario Preferred are only relaxed when conflicting with $A_{AsIs}$. The rules $R'_{BASE}$ are enforced and met in an allocation, $A_{Preferred}$, but the rules $R_{AsIs}$ need not be.

It is also conceivable to automate the semi-manual process above. That is, define all set of rules, $R_{BASE}$, $R_{AsIs}$, and $R_{Preferred}$ prior to beginning that above process, and define what reference allocations to use when, etc.

Identifying Sources of Infeasibility

As described above, the approach based on one or more reference allocations can provide information about which rules were violated, and to what degree, in order to obtain a feasible solution. Though it can be very useful to obtain such a "best effort" feasible solution, this is sometimes not very informative for the user. In tenders with great complexity, the fact that a certain rule had to be violated can come as a surprise, and in order to understand why it was violated, more information (e.g. what other rules a specific rule is contradicting) would be very useful.

In various embodiments, a sourcing system can be configured to automatically take infeasibility resolution actions if a user attempts to solve a scenario which turns out to be infeasible. Such an action could, for example, be to relax rules using a reference allocation as discussed above. It could also be to inform the user about sources of infeasibility. The latter can for example be in the form of a report formatted in a suitable way for direct display on a screen or for download.

In one embodiment, the method for providing information about the source(s) of infeasibility can be based on expressing high level rules as a Mathematical Programming problem using, for example, Mixed Integer Programming (e.g. as described in Andersson, Arne, Mattias Tenhunen, and Fredrik Ygge. "Integer programming for combinatorial auction winner determination." *MultiAgent Systems*, 2000. *Proceedings. Fourth International Conference on*. IEEE, 2000), and then maintain a mapping between (i) high-level rules and (ii) constraints in the Mathematical Programming problem. Such a mapping could look like that shown in Table 9 below:

TABLE 9

A mapping between rules and constraints.

| Constraint | Stems from |
| --- | --- |
| B1_I1 + B1_I2 + B1_I3 + B1_I4 <= 3.5 | Rule A |
| B1_I1 + B1_I2 + B1_I3 >= 3 | Rule B |
| B1_I1 + B1_I2 + B1_I3 + B1_I4 <= 2 | Rule C |
| B1_I1 − B1_I5 = 0 | |

Next, one or more Irreducible Infeasible Sets (IIS) of constraints, sometimes called Irreducible Inconsistent Subsystem, are identified. The identification of IIS for a Mixed Integer Programming problem can be done with any of a variety of available Mixed Integer Programming solvers, or by some special purpose algorithm.

Figure 5:
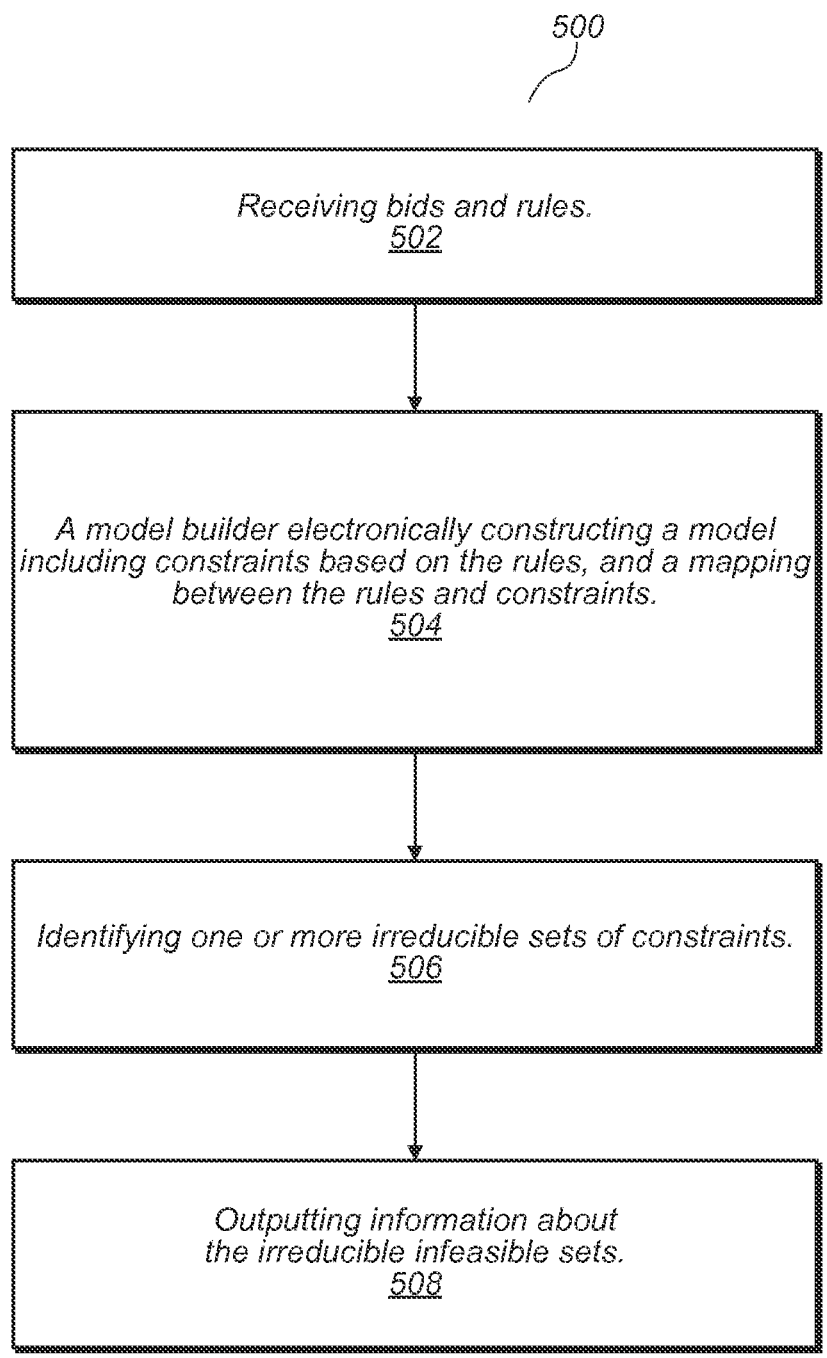
FIG. 5 illustrates one embodiment of a method for receiving and managing bids.

Generally speaking, in the process above when one or more Irreducible Infeasible Sets have been identified, the result is output by being saved to a machine readable media in a proper format or shown on a display of a computing device. One embodiment of such a method is depicted in FIG. 5. FIG. 5 illustrates a method 500 that includes receiving bids and rules (block 502), and a model builder electronically constructing a model including constraints based on the rules, and a mapping between the rules and constraints (block 504). One or more irreducible sets of constraints are then identified (block 506), and information about the identified irreducible infeasible sets is generated, stored, and/or output, etc. (block 508).

For the case of a complex rule, it may be translated to many constraints mapping to the same rule (cf. Rules 3 in Table 3). For the case of a simple rule, it may be translated directly as a bound on a variable. Hence, variable bounds can map to one or more rules. In various embodiments, all rules may not need to be modeled in the mathematical programming problem, but they may be maintained separately for efficiency. Call this set of separately maintained rules, $S_R$. One example of a rule in $S_R$ could be a "Reject Bids" rule, which may cause one or more bids not to appear at all in the mathematical programming problem. Information about $S_R$ can be added once the mathematical programming solver has returned one or more IIS. This can be done optimally (for example by performing an analysis of rules in $S_R$) or in some approximate way (for example by indicating where there are bids affected by rules in $S_R$).

Some rules may have a repetition. An example of such a rule could be "Allocate at most 3 winners per country". In this case, the mapping will also preferably contain enough information to derive which part of the repetition (such as country) a constraint maps to in order to provide a more accurate reporting, further illustrated below.

Once the IIS have been identified, different types of output(s) and reports can be produced. These may be in many forms—from a simple message directly on a display, to an extensive, formatted, report. It can also be visible in an interface for viewing and/or editing rules, so that, for example, rules that are part of one or more infeasible set(s) are highlighted. Furthermore, possible changes of the limits of one or more rules being part of an infeasible set of rules may be suggested or automatically performed based on an analysis of the problem at hand.

It some cases it may be advantageous to report several IIS in order to enable the buyer to resolve multiple sources of infeasibility at the same time. In practice, a reported infeasibility may reveal errors in project set-up, data problems, or other errors or problems which should be corrected. One example of an IIS report in a spreadsheet-like format is shown in FIG. 6. In addition to what is shown in the sample report, the report can contain other information, such as the number of bids that occur in all of the conflicting rules. FIG. 6 illustrates one embodiment of an infeasibility analysis report 600 in a table/spreadsheet format. In the sample report shown, rules R1 and R2 are identified as contradictory (602), rule R17 is identified as being a rule that cannot be fulfilled (604), and rules R3, R12, and R13 are also identified as contradictory (606).

The method of identifying sources of infeasibility can be combined with the above discussed methods in different ways. For example, an identification of sources of infeasibility can allow the buyer to set specific rule violation penalties on some of them.

Sample System Deployment

Figure 7:
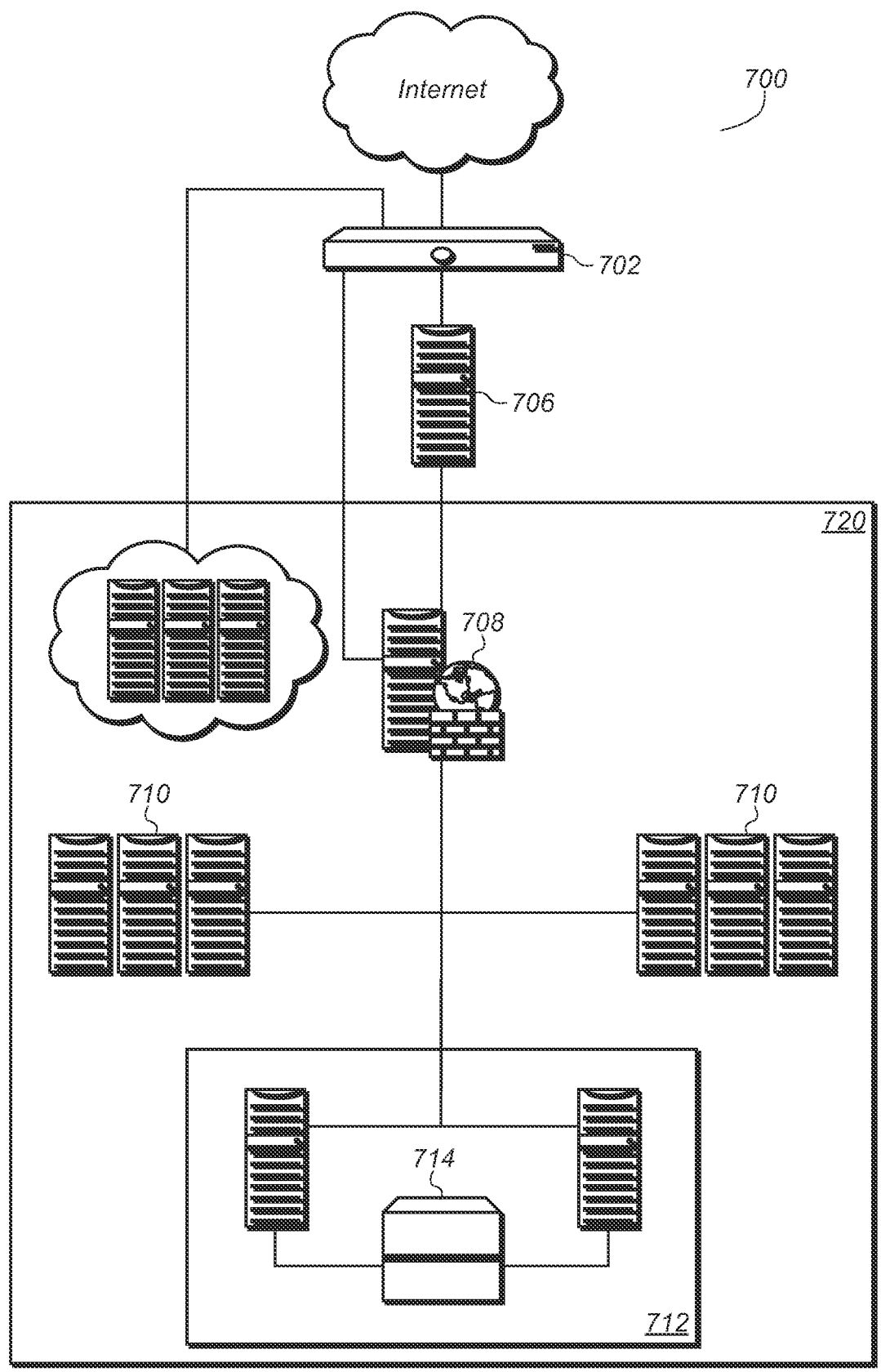
FIG. 7 illustrates one embodiment of a computing system.

Turning now to FIG. 7, one embodiment of a system that may include the methods and mechanisms described herein is shown. A system of the type described here can typically support hundreds of users simultaneously, which may have many different roles and may be working in different projects. As shown in FIG. 7, the sourcing system 700 is connected to the Internet via a connection including a firewall 702. Web pages for bidders, buyers, and other users can be produced in a web-server 706. A backend server 708 can receive data and signals from the web-server 706 and store data to a database. In this example, a server cluster 712 (e.g., SQL based or otherwise) including storage area network 714 is shown that may store a database. In addition, the backend server 708 may be configured to perform different forms of processing and may also be configured to initiate jobs on other computers.

For example, additional (worker) servers 710 may be utilized for processing tasks and/or storing data. Still further, cloud based servers 704 may be utilized for processing tasks and/or storing data. Further, the backend server may also be configured to manage scheduling of different tasks, such as closing the system for bidding in a specific project. The worker servers 710 can perform computationally intensive tasks, such as solving optimization problems or performing different forms of infeasibility analysis, or any other desired tasks. The system can be dynamic and add hardware dynamically at runtime. This can be in the form of rented computers from a cloud server provider. The server cluster (or other forms of database hardware) generally manages the longer term storage of data. In the example shown, one or more elements within block 720 may referred to as a processing system. In some embodiments, the backend server 708 generally performs processing tasks. In other embodiments, worker servers 710 may be used for performing one or more tasks. Still further, in some embodiments, cloud based servers 704 may be used for performing processing tasks.

Depending on the configuration, bidders may be allowed to place bids through a web-interface 800 such as that shown in FIG. 8, or via uploads of bid forms in one or more designated formats. Submitted bids can be received via the web-server, processed and verified in the backend server, and stored by the database hardware.

The buyer may be allowed to express different desired properties of the allocation of business. A sample set of rules expressing such desired properties is shown in FIG. 9. Such rules can be edited directly on a web-page, submitted via upload of documents or using any other suitable method. Submitted rules can be received via the web-server, processed and verified by the backend server, and stored by the database hardware.

FIG. 10 illustrates one embodiment of a list of scenarios. The buyer can be allowed to compare the consequences of applying different set of rules, by applying them differently in different scenarios. Such scenarios can be edited directly on a web-page, submitted via upload of documents or using any other suitable method. Submitted scenarios can be received via the web-server, processed and verified by the backend server, and stored by the database software. FIG. 10 shows such a possible list of scenarios. Exact rule settings not shown, but the names of the scenarios give some guidance in the example. For example, scenario 1 is a cherry pick scenario (a commonly used term denoting awarded the lowest possible bid for every item without any rules or other limitations). Then scenario 2 is limiting the allocation to two winners. As a consequence of this, the payment raises from 2,017,246 USD to 2,035,246 USD. Similarly the other scenarios show trade-offs between desirable properties and cost. Scenario (index) 5 of FIG. 10 is infeasible, i.e. contains contradicting rules and hence does not have a solution.

If, for example, a buyer initiates the solving of a scenario by pushing a button on a web-page, the information can be received by the web-server and processed by the backend server. The backend server may then update the status of the solve job via the database hardware. It can also schedule the solving to be performed by a worker server. The worker server can receive a job description, read required data from the database, solve the scenario, output the result to the database hardware, and update the job status when appropriate.

FIG. 11 shows a sample web-page displaying some details of scenario 5. Status is displayed as Infeasible. The user is offered some help for infeasibility resolution. In this example, an Infeasibility Analysis report is available. This can be implemented to be done automatically by the system when the scenario was concluded infeasible, or to be done manually on request by the user. The content of this report can be of the type displayed in FIG. 6. In FIG. 11 there is also provided the possibility of solving the scenario using a reference allocation. From a hardware processing perspective, the relaxation of rules and solving the relaxed model can be similar to the processing of a standard solve of a scenario.

In FIG. 12, the scenarios of FIG. 10 are shown again, but now scenario 5 has been solved using a relaxation based on a reference allocation "Zero". To analyze the outcome in more details, an e-sourcing system can allow for the production of different reports. If, for example, a buyer initiates report generation of a scenario by pushing a button on a web-page, the information can be received by the web-server and processed by the backend server. The backend server can then update the status of the job via the database hardware. It can also schedule the solving to be performed by a worker server. The worker server can receive a job description, read required data from the database, solve the scenario, output the result to the database hardware, and update the job status when appropriate.

One such report is shown in FIG. 13. In this example, two columns per scenario are displayed: the allocated share of the volume in %, and the payment in USD. From the report, it can for example be seen that for scenario 2, the rule of max 2 winners is fulfilled. For scenario 5 it can be noted that all rules could not be fulfilled (as expected since the scenario contains contradicting rules and is infeasible). If we assume that reference allocation Zero means no allocation, using this reference implies relaxing the rules "Min 75% to bidder 1", and "Min 5% to each of bidder 6 & 7". In this particular example, the solver found a solution by violating one constraint in the rule "Min 5% to each of bidder 6 & 7", namely the constraint on min 5% to bidder 6.

It is noted that the above-described embodiments may comprise software. In such an embodiment, the program instructions that implement the methods and/or mechanisms may be conveyed or stored on a computer readable medium, or on multiple computer readable media. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, as described one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method of conducting e-sourcing, the method comprising:
   receiving, by a computing device having a computer memory, from one or more bidding computer devices, bid data, wherein the bid data comprises one or more bids from each bidding computer device, the one or more bids each comprising one or more allocation rules representing one or more constraints;
   computing, by the computing device, a first optimization model, wherein said first optimization model comprises a first plurality of bids comprising a first plurality of allocation rules representing a first plurality of constraints, wherein the first optimization model is computed based, at least in part, on the bid data;
   determining, by the computing device, that the first optimization model does not have a feasible allocation, wherein the feasible allocation is a solution which satisfies the plurality of allocation rules of the first optimization model;
   in response to determining that the first optimization model does not have a feasible allocation, the computing device:
      comparing the plurality of allocation rules to a reference allocation stored in the memory of the computing device;
      in response to determining that at least one allocation rule of said plurality of allocation rules is in conflict with the reference allocation, performing:
         computing, by the computing device, a second optimization model comprising a second plurality of bids comprising a second plurality of allocation rules representing a second plurality of constraints by relaxing at least one conflicting allocation rule in the first optimization model by imposing a penalty on the at least one conflicting allocation rule,
         wherein the penalty for the at least one conflicting allocation rule is proportional to a deviation computed for the at least one conflicting allocation rule based on a magnitude of deviation of the at least one conflicting allocation rule from the reference allocation;
         sending, to a first subset of the one of more bidding computer devices, the second optimization model and the penalized at least one conflicting allocation rule, wherein the first subset of the one or more bidding computer devices comprises one or more bidding computer devices from which the at least one conflicting allocation rule was received;
         receiving, by the computing device, an indication of acceptance of the penalized at least one conflicting allocation rule from each bidding computer device in the first subset of the one or more bidding computers; and
         solving the second optimization model by accepting the second plurality of bids comprising the second optimization model.

2. The computer-implemented method of claim 1, wherein said reference allocation comprises one of a zero allocation and an incumbent allocation that awards bids to incumbent bidders more frequently than new bidders.

3. The computer-implemented method of claim 1, wherein computing the second optimization model by relaxing said at least one conflicting allocation rule comprises omitting said at least one conflicting allocation rule from said second optimization model.

4. The computer-implemented method of claim 1, further comprising in response to determining the first optimization model does not have a feasible allocation, sending, to one or more devices, an indication that the first optimization model does not have a feasible allocation.

5. A non-transitory computer readable medium comprising program instructions executable to:
receive, by a computing device having a computer memory, from one or more bidding computer devices, bid data, wherein the bid data comprises one or more bids from each bidding computer device, the one or more bids each comprising one or more allocation rules representing one or more constraints;
compute, by the computing device, a first optimization model, wherein said first optimization model comprises a first plurality of bids comprising a first plurality of allocation rules representing a first plurality of constraints, wherein the first optimization model is computed based, at least in part, on the bid data;
determine, by the computing device, that the first optimization model does not have a feasible allocation, wherein the feasible allocation is a solution which satisfies the plurality of allocation rules of the first optimization model;
in response to determining that the first optimization model does not have a feasible allocation, the program instructions further causing the computing device to:
compare the plurality of allocation rules to a reference allocation stored in the memory of the computing device;
in response to determining that at least one allocation rule of said plurality of allocation rules is in conflict with the reference allocation, perform:
compute, by the computing device, a second optimization model comprising a second plurality of bids comprising a second plurality of allocation rules representing a second plurality of constraints by relaxing at least one conflicting allocation rule in the first optimization model by imposing a penalty on the at least one conflicting allocation rule,
wherein the penalty for the at least one conflicting allocation rule is proportional to a deviation computed for the at least one conflicting allocation rule based on a magnitude of deviation of the at least one conflicting allocation rule from the reference allocation;
send, to a first subset of the one of more bidding computer devices, the second optimization model and the penalized at least one conflicting allocation rule, wherein the first subset of the one or more bidding computer devices comprises one or more bidding computer devices from which the at least one conflicting allocation rule was received;
receive, by the computing device, an indication of acceptance of the penalized at least one conflicting allocation rule from each bidding computer device in the first subset of the one or more bidding computers; and
solve the second optimization model by accepting the second plurality of bids comprising the second optimization model.

6. The non-transitory computer readable medium of claim 5, wherein said reference allocation comprises one of a zero allocation and an incumbent allocation that awards bids to incumbent bidders more frequently than new bidders.

7. The non-transitory computer readable medium of claim 5, wherein computing the second optimization model by relaxing said at least one conflicting allocation rule comprises omitting said at least one conflicting allocation rule from said second optimization model.

8. The non-transitory computer readable medium of claim 7, wherein the second optimization model is computed to minimize modification of one or more allocation rules that were determined not to be in conflict with the reference allocation.

9. A computing system comprising:
a data store configured to store data; and
a processing system, wherein the processing system is configured to:
receive, by a computing device having a computer memory, from one or more bidding computer devices, bid data, wherein the bid data comprises one or more bids from each bidding computer device, the one or more bids each comprising one or more allocation rules representing one or more constraints;
compute, by the computing device, a first optimization model, wherein said first optimization model comprises a first plurality of bids comprising a first plurality of allocation rules representing a first plurality of constraints, wherein the first optimization model is computed based, at least in part, on the bid data;
determine, by the computing device, that the first optimization model does not have a feasible allocation, wherein the feasible allocation is a solution which satisfies the plurality of allocation rules of the first optimization model;
in response to determining that the first optimization model does not have a feasible allocation, the processing system further causing the computing device to:
compare the plurality of allocation rules to a reference allocation stored in the memory of the computing device;
in response to determining that at least one allocation rule of said plurality of allocation rules is in conflict with the reference allocation, performing:
compute, by the computing device, a second optimization model comprising a second plurality of bids comprising a second plurality of allocation rules representing a second plurality of constraints by relaxing at least one conflicting allocation rule in the first optimization model by imposing a penalty on the at least one conflicting allocation rule,
wherein the penalty for the at least one conflicting allocation rule is proportional to a deviation computed for the at least one conflicting allocation rule based on a magnitude of deviation of the at least one conflicting allocation rule from the reference allocation;
send, to a first subset of the one of more bidding computer devices, the second optimization model and the penalized at least one conflicting allocation rule, wherein the first subset of the one or more bidding computer devices comprises one or more bidding computer devices from which the at least one conflicting allocation rule was received;

receive, by the computing device, an indication of acceptance of the penalized at least one conflicting allocation rule from each bidding computer device in the first subset of the one or more bidding computers; and solve the second optimization model by accepting the second plurality of bids comprising the second optimization model.

10. The computing system as recited in claim 9, wherein said, reference allocation comprises one of a zero allocation and an incumbent allocation that awards bids to incumbent bidders more frequently than new bidders.

11. The computing system as recited in claim 9, wherein computing the second optimization model by relaxing said at least one conflicting allocation rule comprises omitting said at least one conflicting allocation rule from said second optimization model.

12. The computing system as recited in claim 11, wherein the second optimization model is computed to minimize modification of one or more allocation rules that were determined not to be in conflict with the reference allocation.

13. The computing system as recited in claim 9, wherein in response to determining the one or more allocation rules are in conflict with the reference allocation, the processing system is configured to relax all of the one or more allocation rules identified as being in conflict with the reference allocation.

* * * * *